April 2, 1940.  O. E. STAPLES ET AL  2,196,087
MACHINE FOR CUTTING GEARS
Filed July 16, 1936  3 Sheets-Sheet 1

INVENTORS.
OTIS E. STAPLES
BY CHARLES M. PERKINS
Kwis, Hudson & Kent
ATTORNEYS.

INVENTORS
OTIS E. STAPLES
BY CHARLES M. PERKINS
ATTORNEYS.

Patented Apr. 2, 1940

2,196,087

UNITED STATES PATENT OFFICE 2,196,087

MACHINE FOR CUTTING GEARS

Otis E. Staples and Charles M. Perkins, Cleveland, Ohio, assignors to The Cleveland Hobbing Machine Company, Cleveland, Ohio, a corporation of Ohio Application July 16, 1936, Serial No. 90,836

2 Claims. (Cl. 90—5)

The present invention relates to machine tools, particularly gear cutting machines, and to an improved means for effecting a predetermined relative movement between certain parts thereof.

An object of the present invention is the provision of a novel gear cutting machine comprising a cam for effecting a predetermined relative movement between the tool and work and means for stopping or interrupting the movement of the cam while a finishing cut is being taken.

Another object of the present invention is the provision of a novel continuous indexing face hob or rotary broach type gear cutting machine comprising a cam for effecting the relative feed movement between the cutter or tool and the work, and means for stopping or interrupting the movement of the cam during the finishing cut or last revolution of the work.

The invention resides in certain novel details of construction and combinations and arrangements of parts, and further objects and advantages thereof will be apparent to those skilled in the art to which it relates from the following description of the preferred embodiment described with reference to the accompanying drawings forming a part of this specification, in which similar reference characters designate corresponding parts throughout the several views, and in which.

Figure 1:
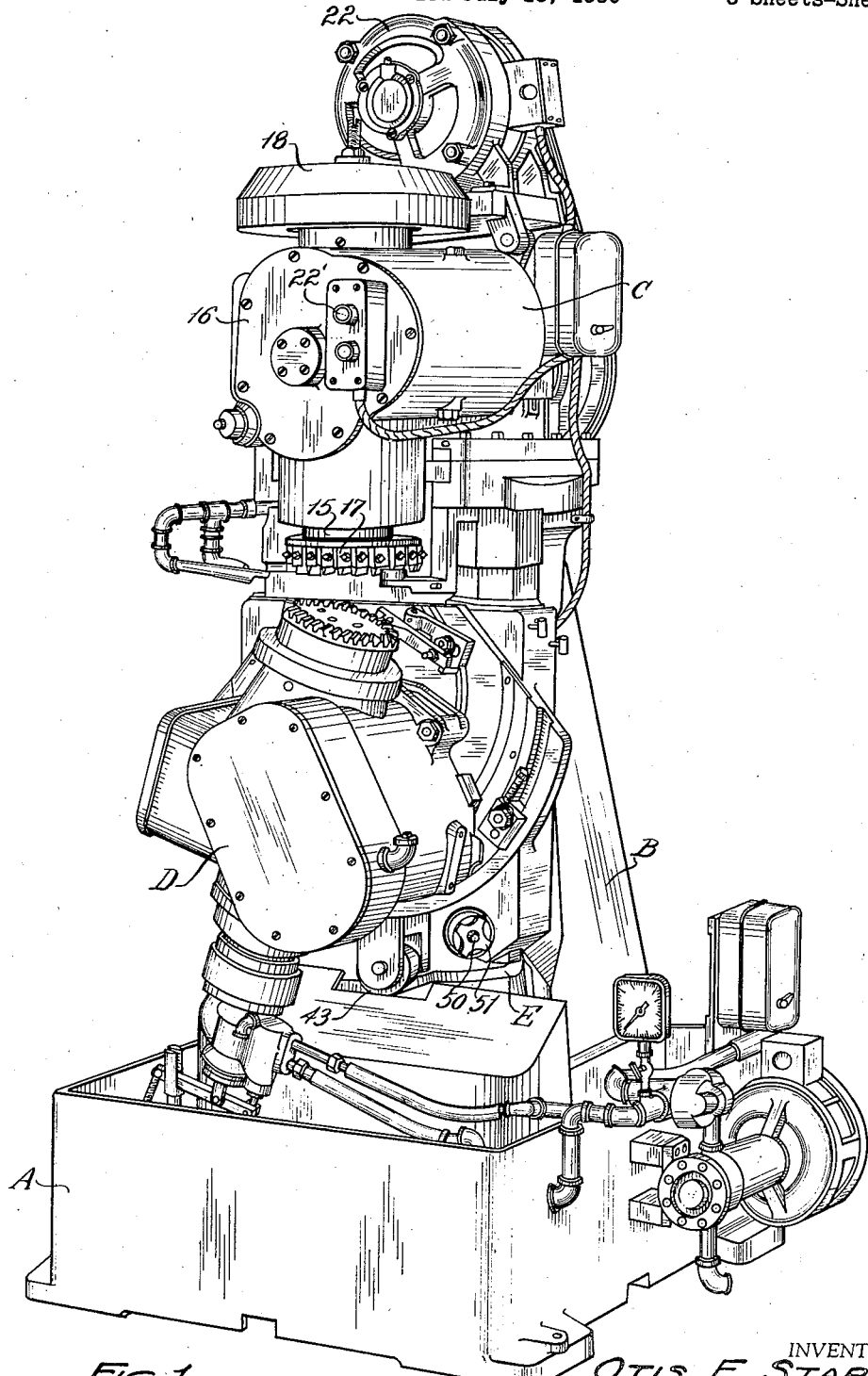
Fig. 1 is a perspective view of a face hob or continuous broaching type spiral bevel gear cutting machine embodying the present invention.

Referring to the drawings, Fig. 1 shows a continuous indexing face hob or rotary broach type of spiral bevel gear cutting machine which operates on a principle substantially analgous to that disclosed and claimed in United States patent of Frank H. Adams, No. 1,973,135, issued to the assignee of the present application. In general the machine shown comprises: a rectangular base A, which also serves as an oil or drip pan; an upright frame B bolted thereto; a tool head assembly, designated generally by the reference character C, slidably supported on horizontal ways formed on the top of the frame B; and a work head assembly, designated generally by the reference character D, slidably supported on vertical ways formed on the front of the frame B. The work head D is moved vertically along the ways on the front of the frame B to feed the work to the cutter and withdraw the same therefrom, by a rotatable cam E supported in the lower part of the frame and driven or rotated in a manner hereinafter specifically pointed out.

The tool or cutter head C comprises a vertical spindle 15 rotatably supported in the tool head housing 16 through the medium of suitable bearings provided with means for taking up wear, etc. The cutter 17 is detachably secured to the lower end of the spindle 15 in any convenient manner and the upper end of the spindle carries a flywheel 18 keyed thereto, which serves the usual purpose. The spindle 15 is adapted to be driven or rotated from a spur gear 19, keyed to the right hand end of a horizontal shaft 20 rotatably supported in the tool head housing 16, through the medium of change gears, etc. (not shown), and a worm wheel 21 keyed to the spindle. The horizontal shaft 20 is driven from an electric motor 22 mounted on the top of the tool head housing 16, the operation of which is under the control of a push button switch 22' mounted on the front of the head.

The work head D comprises a member 25 slidable on the vertical ways formed on the front of the frame B, and a second member 26 carried thereby and adjustable thereon about a horizontal axis. The work spindle 27 is rotatably supported in the member 26 by means of suitable bearing members, etc., and is driven from a horizontal shaft 30, coaxial with the axis about which the member 26 is adjustable, through spur gears 31, 32, change gears, etc. (not shown), and a worm wheel 33 keyed to the work spindle. The horizontal shaft 30 is operatively connected to a vertical shaft 34, rotatably supported in the frame B, through miter gears 35 and 36, the latter of which is splined to the shaft 34 to provide for the vertical movement of the work head. The vertical shaft 34 is operatively connected to and rotated from the horizontal shaft 16 through miter gears 39 and 40, the latter of which is splined to the shaft 16, to permit forward and backward adjustment of the tool head along the ways at the top of the frame.

The work head D is adapted to be moved vertically to feed the work to the cutter and retract the same therefrom by the cam E, previously referred to, through the medium of a roller 43 which engages and rolls upon the upper surface of the cam. The roller 43 is carried by a short shaft 44 fixed in the lower end of a member 45 connected to the member 25 and adjustable vertically relative thereto to facilitate the "setting up" of the machine. The adjustment of the member 45 relative to the member 25 is effected by a cooperating lead screw 46 and nut 47, the former of which is carried by the member 25 and the latter by the member 45. To facilitate manipulation of the lead screw 46, and in turn the adjustment of the height of the work blank, the lower end of the lead screw is provided with a worm wheel 48 which is continuously in mesh with a worm 49 attached to the rear end of a horizontal shaft 50 which projects to the exterior of the member 25 where the projecting end thereof is provided with a hand wheel or knurled hand grasp 51 for manual operation thereof.

Figure 2:
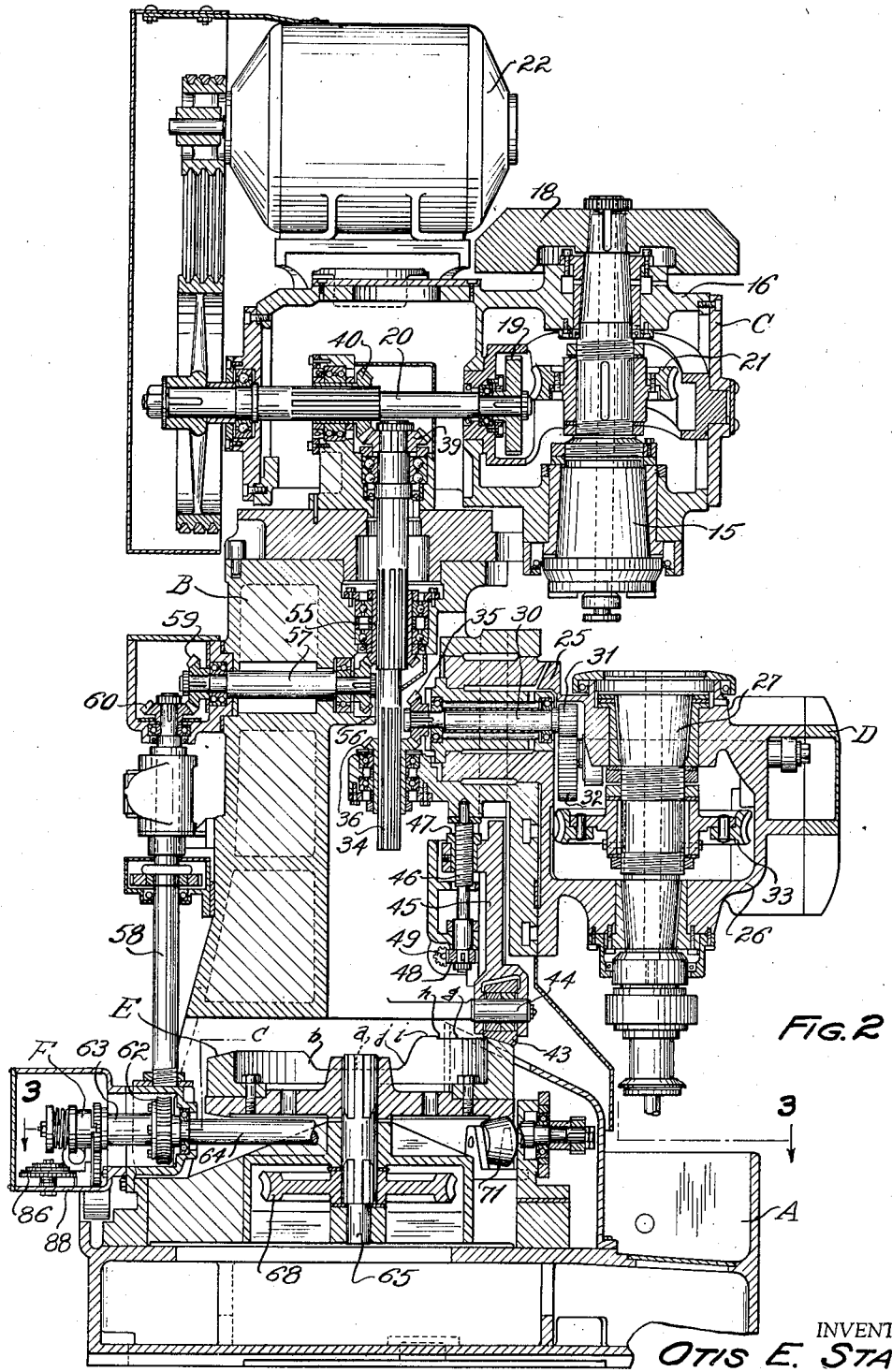
Fig. 2 is a section approximately on the center line of the machine shown in Fig. 1, with portions in elevation.
Figure 3:
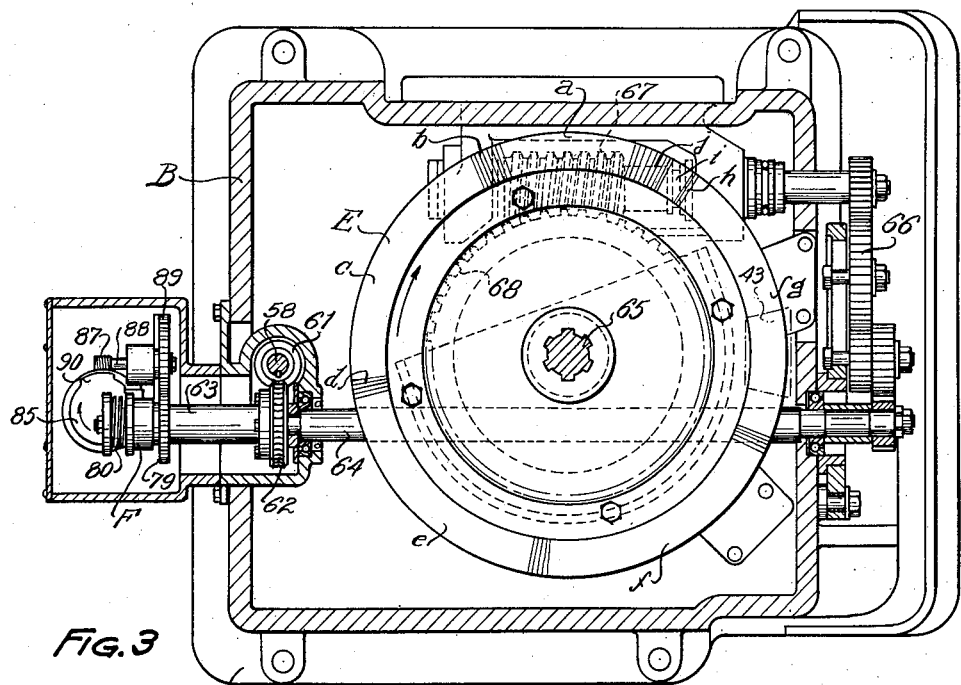
Fig. 3 is a section approximately on the line 3—3 of Fig. 2, with portions shown in elevation.

The cam E is driven or rotated from the vertical shaft 34 through the medium of miter gears 55 and 56, the former of which is rotatably supported in the frame B and splined to the shaft 34, and the latter is fixed to the right hand end of a vertical shaft 57. The shaft 57 is operatively connected to a horizontal shaft 58 through miter gears 59 and 60. The lower end of the shaft 58 carries a worm gear 61 fixed thereto, which is continuously in mesh with a worm wheel 62 fixed to the right hand end of a horizontal tubular shaft 63 supported coaxial with a solid shaft 64. The right hand end of the solid shaft 64, as viewed in Figs. 2 and 3, is operatively connected to a vertical shaft 65 which carries the cam E, through change gears designated generally by the reference character 66, and a worm 67 and worm wheel 68, the latter of which is keyed to the lower part of the shaft 65. The two coaxial shafts 63 and 64 are separated by a bushing member 69 interposed therebetween and are adapted to be operatively connected to each other by a clutch designated generally by the reference character F. Since the entire weight of the work head D, etc. is supported by the cam E, a plurality of backing rollers 71 are provided thereunder adjacent the front of the machine. These rollers carry the weight of the work head D, which otherwise would have a tendency to displace the cam.

In operation the work blank is fed into the cutter which makes one complete revolution, while the blank is rotating an amount equal to one tooth. The work may be gradually raised in a continuous movement until the cutter reaches full depth, but preferably it is raised in a number of steps. In the embodiment shown the cam is continuously rotated except as hereinafter noted, and the loading operation is performed while the low part $a$ of the cam travels underneath the roller 43. At the end of the loading period the roller 43 rides up the incline $b$ which quickly brings the work blank up to the cutter. While the level portion $c$ of the cam travels underneath the roller the blank makes one revolution and the first roughing cut is completed. The work is then raised a small amount by the inclined portion $d$ and another roughing cut taken, while the level portion $e$ travels underneath the roller. In the present instance four roughing cuts are taken, the last two of which take place during the travel of the portions $f$ and $g$ of the cam underneath the roller 43. As soon as the last roughing cut is completed the work blank is elevated a small amount preferably about .010" by the roller moving up the incline $h$. Shortly after the roller reaches the high part of the cam $i$ the rotation of the cam E is interrupted by the disengagement of the clutch F, and the finishing cut taken while the cam is stationary. This precludes the possibility of any errors being introduced into the teeth due to possible irregularities in the cam surface or in the backing rollers which support the cam. Immediately upon the completion of the finishing cut, the clutch F is again engaged and the cam resumes its rotation, whereupon the roller 43 travels down the inclined portion $j$ of the cam, and the finished work blank is thereby withdrawn from the cutter.

In Fig. 1 the various parts of the machine are shown in the position which they occupy immediately after the blank has been chucked to the work spindle. The cam E rotates in a clockwise direction and it will be observed that the incline $b$ is about to travel underneath the roller 43. Fig. 2 shows the position of the parts at the beginning of the last roughing cut. In this figure the work spindle is rotated to a vertical position for the purpose of simplifying the section, and the cutter and work blank are omitted because with the spindles in the position shown they do not assume their operating positions. The work spindle chuck shown in the drawings is a fluid pressure actuated chuck of conventional construction, and per se forms no part of the present invention.

Figure 4:
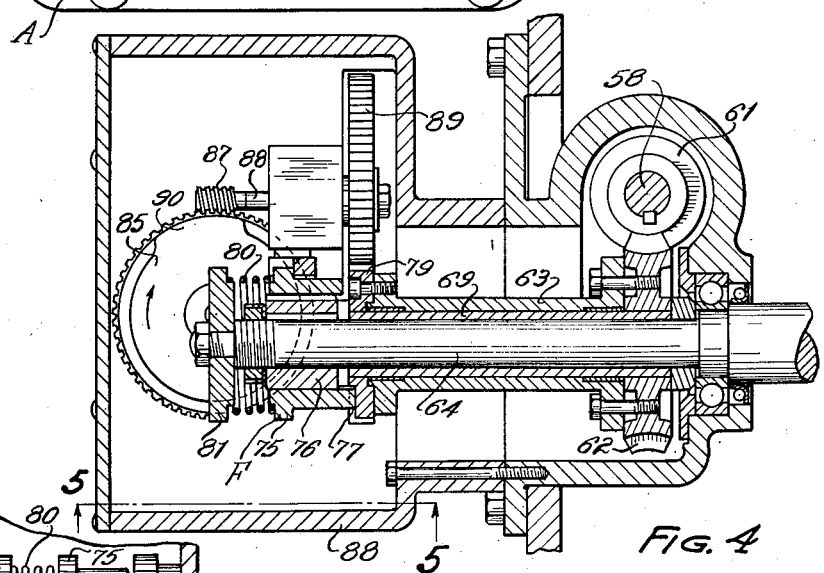
Fig. 4 is an enlarged section on the line 4—4 of Fig. 5, with portions in elevation.
Figure 5:
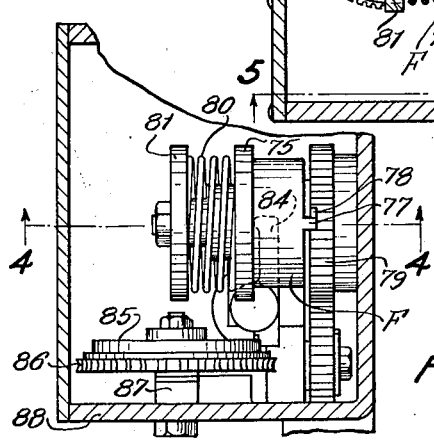
Fig. 5 is a section on the line 5—5 of Fig. 4.

The single tooth clutch F shown, which is the preferred embodiment, although other types of clutches may be employed, comprises a driven part or member 75, slidably keyed on a member 76 fixed to the shaft 64 adjacent the left-hand end thereof, as viewed in Fig. 4. The member 75 is driven through the medium of a lug or tooth 77, formed integral therewith, adapted to project into and engage within a suitable slot 78 formed in the side of a spur gear 79 fixed to the left-hand end of the tubular shaft 63. The driven member of the clutch F is continuously urged toward the right to engage the projection 77 within the aforesaid slots 78 by a compression spring 80 interposed between the end thereof and a member 81 secured to the end of the shaft 64. In predetermined timed relation to the other operations of the machine the driven member 75 is moved towards the left to disengage the lug 77 from the slot 78 in the gear 79, and thereby interrupt the drive to the shaft 64 and in turn the rotation of the cam E, by a pivot lever 84 the lower end of which engages a horizontal cam 85. The cam 85 is fixed to the upper side of a worm wheel 86 rotatably supported on a post 87 fixed to a housing 83 bolted or otherwise secured to the rear part of the frame B. The cam 85 is continuously rotated through the medium of worm wheel 86 by a worm 87 continuously in mesh therewith and fixed on the end of a shaft 88 provided with a spur gear 89 in mesh with the gear 79. The construction of the cam 85 is such that the high part thereof designated by reference character 90 rotates or moves the lever 84 in a counterclockwise direction at a predetermined point in the cycle of operation of the machine, and retains the clutch F in a disengaged condition for the duration of the finishing cut, as heretofore referred to.

While the preferred embodiment of the invention has been illustrated and described in some detail, it will be apparent that numerous changes in the construction shown may be made within the scope of the invention. As already stated the cam E may have a continuous rise rather than a plurality of steps, in which event the work blank would be gradually fed into the cutter, but in either event the rotation of the feed cam will be interrupted during the finishing cut so that possible irregularities therein will not be introduced into the gear being cut, which is necessarily finished to a high degree of accuracy. Likewise means other than that shown may be provided for effecting the interruption of the rotation of the feed cam at the desired point in the cycle of operation of the machine, and again start the rotation upon the completion of the finishing cut.

The preferred embodiment shown is merely illustrative of the invention, and it is our intention to cover all adaptations, modifications and uses thereof that come within the practice of those skilled in the art to which the invention relates, and we particularly point out and claim as our invention the following:

1. In a continuous indexing face hob or rotary broach type of spiral bevel gear cutting machine, the combination of a frame, a tool spindle rotatably supported by said frame and adapted to have a continuous indexing face hob or rotary broach type of cutter secured to the lower end thereof, a work spindle rotatably supported by said frame and adapted to have a gear blank secured to the upper end thereof, means for rotating said spindles at predetermined relative speeds, a rotatable cam for reciprocating the work spindle towards and from said tool spindle in a direction parallel to the axis of rotation of said tool spindle to effect both feeding and receding movements between said tool and work spindles, means including a clutch for operatively connecting said cam to said means for rotating said spindles whereby said cam is rotated in timed relation to the rotation of said spindles, means including a second cam for automatically disengaging said clutch for the duration of approximately one rotation of the work spindle when said work spindle reaches a predetermined position relative to said tool spindle, and means for rotating said second cam in timed relation to the rotation of said work spindle.

2. In a continuous indexing face hob or rotary broach type of spiral bevel gear cutting machine, the combination of a frame, a tool head supported by said frame, a tool spindle rotatably supported by said tool head and adapted to have the face hob or rotary broach type of cutter secured to the lower end thereof, a work head slidably supported by said frame for movement in a vertical plane, a member supported by said work head and adjustable thereon about a horizontal axis, a work spindle rotatably supported by said member and adapted to have a gear blank secured to the upper end thereof, means for rotating said spindles at predetermined relative speeds, a rotatable cam below said work head for reciprocating the same in a vertical plane to move the same towards and from said work spindle, means for operatively connecting said cam with the means for rotating said spindles, said last mentioned means comprising a shaft operatively connected to said cam, a sleeve rotatably supported coaxially with said shaft and operatively connected to the means for rotating said spindles, a clutch for operatively connecting said shaft and said sleeve, a cam for disengaging said clutch, and means for rotating said second mentioned cam in timed relation to the rotation of said spindles whereby said clutch is periodically disengaged for the duration of approximately one rotation of said work spindle.

CHARLES M. PERKINS.
OTIS E. STAPLES.